April 29, 1969     P. RENAULT     3,441,379
PROCESS FOR CONVERTING HYDROGEN SULFIDE INTO ELEMENTARY SULFUR
Filed March 30, 1966
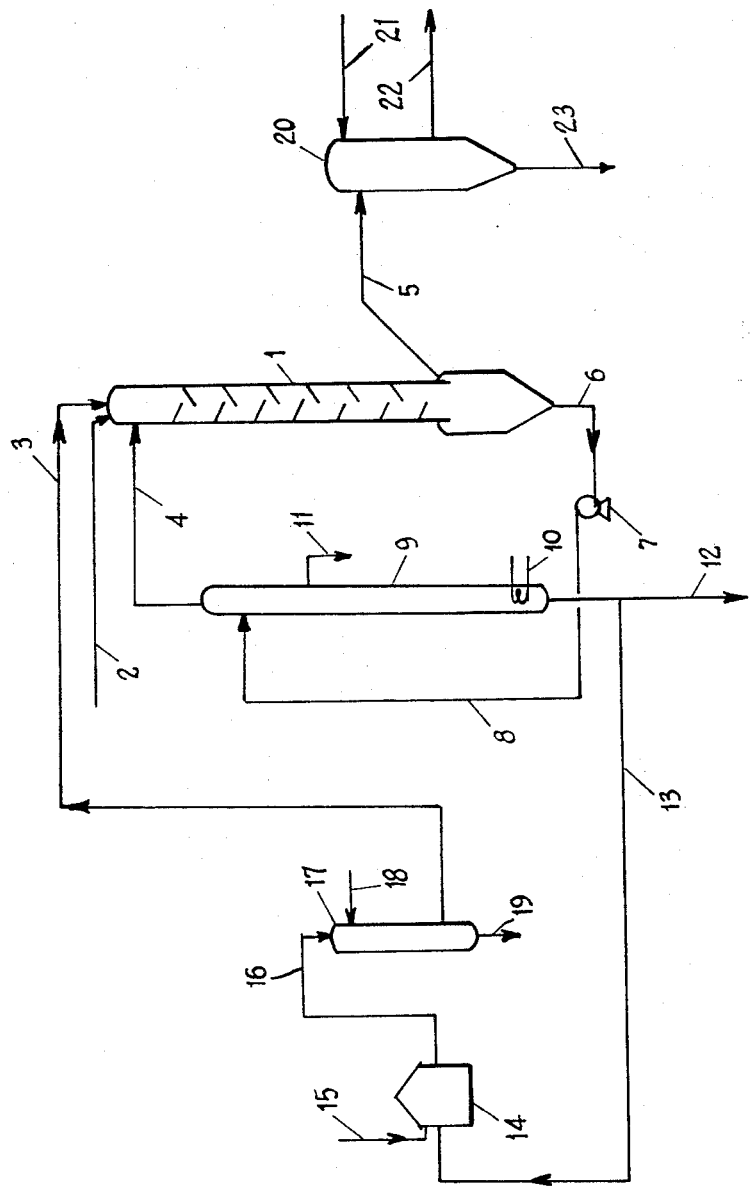
INVENTOR
PHILIPPE RENAULT
BY J. William Miller
ATTORNEY

United States Patent Office 3,441,379
Patented Apr. 29, 1969

3,441,379
PROCESS FOR CONVERTING HYDROGEN SULFIDE INTO ELEMENTARY SULFUR
Philippe Renault, Neuilly-sur-Seine, France, assignor to Institut Francais du Petrole, des Carburants et Lubrifiants, Rueil-Malmaison, France
Filed Mar. 30, 1966, Ser. No. 538,652
Claims priority, application France, Mar. 30, 1965, 11,307
Int. Cl. C01b 17/04, 17/06
U.S. Cl. 23—226      7 Claims

ABSTRACT OF THE DISCLOSURE

By utilizing a liquid ester of a phosphoric acid, such as tri-n-butyl orthophosphate, as the reaction medium for producing elementary sulfur by the reaction of hydrogen sulfide with sulfur dioxide, the yield and rate of reaction are increased, and the sulfur is obtained in the form of readily filterable particles. In addition, atmospheric pollution due to waste gases from the Claus process and other processes containing low concentrations of $SO_2$ and/or $H_2S$, can be substantially reduced.

---

This invention relates to an improved process for converting hydrogen sulfide into elementary sulfur.

It has already been proposed to utilize hygroscopic organic solvents to shift the equilibrium to the right in the reaction

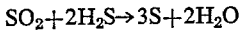

$$SO_2 + 2H_2S \rightarrow 3S + 2H_2O$$

This reaction is strongly exothermic and, as can be seen, produces ⅔ of a mol of water per mol of sulfur. This water, which is dissolved by the solvent, must be eventually separated therefrom. For example, when operating at a temperature of about 100° C., it is advisable to eliminate the water substantially as it is formed, but a significant amount of solvent is simultaneously entrained. Under these conditions, the yield is also poor.

The solvents proposed heretofore were generally glycolic compounds (glycols, glycol ethers and esters, etc.)—compounds mostly miscible with water, and thus inseparable from water by simple decantation. Moreover, with these solvents, the sulfur usually appears in the colloidal form and is therefore difficult to separate. Still further, in some of these known processes, there also occurs the formation of polythionates, which results in an even lower yield of elementary sulfur.

An object of this invention, therefore, is to provide an improved process for the production of elementary sulfur from hydrogen sulfide.

Other objects include novel starting compositions, as well as intermediate mixtures.

Upon further study of the specification and claims, other objects and advantages of the present invention will become apparent.

To attain the above-mentioned objectives, a process is provided having the following advantages:

(A) The yield of elementary sulfur is increased.
(B) There is little or no formation of polythionates.
(C) The reaction proceeds more rapidly.
(D) The water can be easily eliminated, without entraining the solvent.
(E) The sulfur appears in the form of readily filterable particles.
(F) The reaction occurs even with low concentrations of $SO_2$ and/or $H_2S$, which makes it possible to treat gases containing small amounts of these compounds, for example the waste gases from the Claus process, to remove therefrom most of the acid gases, an important aspect with respect to reducing atmospheric pollution.

The present invention is based on the use of solvents which, contrary to the prior art, have only a slight affinity for water, but are nevertheless good solvents for $SO_2$ and $H_2S$. These solvents comprise esters of phosphoric acid, used alone or in mixtures, and especially those containing 9 to 30 carbon atoms per molecule.

The attached drawing is a schematic flowsheet of a preferred specific embodiment of this invention.

The poor compatibility of the solvent with the water by-product permits the separation of said water by simple decantation, this being an important advantage of the present invention. However, it is, of course, also possible, though less desirable, to separate the water by vaporization.

The esters of the phosphoric acids that are used in this invention are those which are liquid at the temperature of absorption. Esters of orthophosphoric acid are preferred, especially those corresponding to the general formula $PO(OR)_3$ wherein the R-groups, which can be alike or different, are monovalent hydrocarbon radicals each of which contains at least 3 carbon atoms, especially alkyl of preferably 3 to 18 carbon atoms, cycloalkyl of preferably 5 to 18 carbon atoms, or aryl of preferably 6 to 12 carbon atoms. For example, R can represent propyl, isopropyl, n-butyl, n-octyl, dodecyl, cyclohexyl, phenyl, o-cresyl, benzyl, or analogous radicals. It is preferred, moreover, to use esters having a solubility of less than 1% by weight in water at 20° C. and/or a water-dissolving power of less than 1.5% by weight at 20° C. With the esters of this invetnion, the reaction can occur without any addition of water, and the yield is always greater than that obtained with a glycol, such as diethylene glycol, under the same conditions.

Specific examples of solvents include: tri-n-propyl orthophosphate, tri-isobutyl orthophosphate, tri-n-hexyl orthophosphate, tri-isooctyl orthophosphate, tri-phenyl orthophosphate, tri-o-cresyl orthophosphate, tri-cyclohexyl orthophosphate, and dimethyl-benzyl orthophosphate.

The preferred solvent is tri-n-butyl orthophosphate.

The sulfur that is formed appears in the form of crystals which are easy to isolate by filtration, or which can be melted in an aqueous medium if there is danger of some of the solvent being entrained by, or reacting with, molten sulfur.

The present process is preferably performed at a slightly elevated temperature, for example about 20–80° C., under atmospheric or slightly subatmospheric or superatmospheric pressures, which mild reaction conditions constitute another important advantage of this invention. It is also possible, however, to operate successfully under different temperatures and pressures, for example between 0° C. and 200° C. and under pressures of 0.1 to 100 atmospheres absolute.

The amount of sulfur dioxide that is used is proportional to the amount of $H_2S$ to be eliminated according to the stoichiometry of the precedingly described reaction. It is possible, moreover, without inconvenience, to use an excess of $SO_2$ which is easily recoverable afterwards.

It is not necessary for the sulfur dioxide to be dissolved in the ester before bringing it into contact with the gas that contains the $H_2S$. It is possible to introduce separately the gas to be purified, the ester, and the sulfur dioxide, or to introduce these components two at a time, for example by introducing the $H_2S$ in solution in a phosphoric ester.

If desired, an auxiliary solvent can be added, for example a hydrocarbon, an ether, an ester, or the like.

Use can also be made of catalysts known for this type of reaction.

A variant of this process consists of adding an alkaline agent, for example soda or potash, alkali metal sulfides, an amine or ammonia-type compounds. The latter are especially valuable with the aryl phosphates.

The amount of alkaline agent can be chosen at will. It is preferred, however, to utilize from 0.05 to 1 g. of this agent per liter of phosphoric ester.

For treating the exhaust gases from the Claus process containing small amounts of $SO_2$ and $H_2S$, i.e., about 0.5 to 10 and 1 to 10% by volume, respectively, the use of a solvent with a very low vapor pressure enables the reaction between $SO_2$ and $H_2S$ to be conducted at temperatures above 100° C., such high-boiling esters being, for example, tricresyl phosphate and triphenyl phosphate.

By themselves, the use of these solvents results in a relatively low conversion. This is markedly improved by the addition of the above-mentioned alkaline compounds (for example alkanolamines, mineral bases or even alkaline sulfides), which results in over 50% conversions.

Any known method can be used for bringing the gas into contact with the liquids and by the use of either concurrent, countercurrent, or mixed currents. The usual apparatus for making such contact can be used.

The concentration of sulfur dioxide in the ester can vary widely, for example from 0.05 to 10%, the preferred amount being below 3% by weight, for example between 0.1 and 3%. The sulfur dioxide can be obtained, for example, by combustion of some of the elementary sulfur obtained by this process. It can also be obtained by oxidation or combustion of $H_2S$ or from any other source.

After the reaction, the sulfur can be separated in any suitable manner, either in the solid or in the liquid state.

The present process can be used with hydrogen sulfide alone, or diluted with other gases, especially with gases from refineries, coke ovens, natural gas, gas producers using natural gas, or any other gas-containing hydrogen sulfide, and where there can also be present hydrogen, carbon dioxide, carbon monoxide, mercaptans, carbon oxysulfide, hydrocarbons, or hydrocyanic acid. In certain instances, it is advantageous to concentrate the hydrogen sulfide component by any suitable method, as by extraction with alkanolamines.

Referring now to the drawing, there is illustrated a preferred embodiment of how such a process can be performed.

The gas containing the hydrogen sulfide is conducted by conduit 2 into reactor 1, and the sulfur dioxide is introduced by conduit 3. The phosphoric ester is introduced by conduit 4. The gases that are not absorbed are removed by conduit 5, while the liquids containing the sulfur in suspension are delivered by conduit 6 to the pump 7 and from there by conduit 8 into column 9 for decantation. The sulfur collects in the molten state in the foot of the column, the heat that is required for fusion being provided by coil 10. The phosphoric ester floats on top and is removed by conduit 4, while some of the water produced by the reaction is removed by conduit 11.

The molten sulfur is delivered to storage by conduit 12. A portion of this sulfur can, however, be burned to produce the required sulfur dioxide for this reaction. In this case, the molten sulfur is conducted by conduit 13 into the oven 14. Air is delivered thereto by conduit 15. The gases of combustion of the sulfur are conducted by conduit 16 into the washing column 17 and into contact with the dilute sulfuric acid that is introduced by conduit 18. The sulfur trioxide which is present in the gases is thus removed. The gases are then evacuated by conduit 3, while the sulfuric acid is removed by conduit 19.

The gases from conduit 5 can be washed by the phosphoric ester to separate the residual sulfur dioxide therefrom. They are then passed into column 20, into which phosphoric ester is introduced by conduit 21 and is removed by conduit 22. The phosphoric ester from the washing step can be recycled into column 20 by conduit 23, or can be returned to the head of reactor 1.

Without further elaboration, it is believed that one skilled in the art can, using the preceding description, utilize the present invention to its fullest extent. The following preferred specific embodiments are, therefore, to be construed as merely illustrative, and not limitative, of the remainder of the specification and claims in any way whatsoever.

EXAMPLE 1

Into 100 cm.³ tri-n-butyl phosphate in a mixer that is kept at 23° C., the following two gaseous streams are introduced:

10 l./h. of a gas composed, by volume, of 75% $H_2S$, 20% $CO_2$, and 5% hydrocarbons (mostly methane), and 18.75 l./h. of a gas composed, by volume, of 20% $SO_2$ and 80% nitrogen.

There is then collected 17.5 l./h. of a gas composed of:

|  | Percent |
| --- | --- |
| $SO_2$ | 0.7 |
| $H_2S$ | 2.2 |
| $CO_2$ | 11 |
| $N_2$ | 83.3 |
| Hydrocarbons | 2.8 |

At the same time, 15 g./h. of sulfur are obtained while about 5 g./h. of water are separated.

The yield can be further increased by using an agitator and/or packing which increases the rate of mass transfer by providing fresh interfacial boundaries.

EXAMPLE 2

Into one liter of triphenyl phosphate, kept at 150° C. and containing 0.3 g. $Na_2S$, 112 l./h. are passed of a gas containing 1.5% by volume of $SO_2$ and 3% by volume of $H_2S$. The other constituents of the gas are nitrogen, water vapor, and carbon dioxide in about equal amounts.

The gas obtained does not contain more than 1.4% of acid gases ($SO_2$ and $H_2S$). From the absorbed gases, the sulfur is obtained in a quantitative yield.

EXAMPLE 2 BIS

Into a liter of tricresylphosphate kept at 135° C. and containing 0.1% by weight of diethanolamine, 60 l./h. of a gas consisting of 3% $H_2S$, 1.5% $SO_2$ and 95.5% nitrogen by volume are passed. At the outlet the gas consisted of:

|  | Percent by volume |
| --- | --- |
| $H_2S$ | 0.4 |
| $SO_2$ | 0.2 |
| Nitrogen and steam | 99.4 |

EXAMPLE 3

Into a liter of tricresyl phosphate, kept at 130° C. and containing 0.4 g. NaOH, 60 l./h. of a gas containing 2.5% by volume of $SO_2$ and 5% by volume of $H_2S$ were passed. The remainder of the gas consisted of nitrogen. At the outlet, the gas does not contain more than 1% $SO_2$ and 2% $H_2S$. The yield of sulfur, in relation to the gas absorbed, is quantitative.

EXAMPLE 4

Into a liter of a mixture of equal volumes of tributyl phosphate and triphenyl phosphate, kept at 100° C. and containing 0.2 g./l. of KOH, 60 l./h. of a gas containing 2.5% by volume of $SO_2$ and 5.5% by volume of $H_2S$ were passed. The other constituents of the gas were those of Example 2 in about equal amounts.

At the outlet, the gas does not contain more than 1.5% by volume of acid gases. The yield of sulfur, relative to the amount of $SO_2$ absorbed, is quantitative.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

Consequently, such changes and modifications are properly, equitably, and intended to be, within the full range of equivalence of the following claims.

What is claimed is:

1. In a process for producing elementary sulfur by the reaction of hydrogen sulfide with sulfur dioxide, the improvement comprising conducting said reaction in contact with a liquid ester of a phosphoric acid.

2. The process of claim 1 wherein the phosphoric ester is an ester of orthophosphoric acid.

3. The process of claim 2 wherein the phosphoric acid ester is a compound of the formula $PO(OR)_3$, wherein R is a monovalent hydrocarbon radical of at least 3 carbon atoms.

4. The process of claim 1 wherein the ester of phosphoric acid has a solubility in water at 20° C. of less than 1% by weight.

5. The process of claim 1 wherein the ester of phosphoric acid can dissolve not more than 1.5% of its weight of water at 20° C.

6. The process of claim 1 wherein the reaction is performed in the presence of an alkaline substance.

7. The process of claim 1 wherein the ester is tri-n-butyl orthophosphate.

References Cited

UNITED STATES PATENTS

| | | | |
|---|---|---|---|
| 2,028,336 | 1/1936 | Kuhl | 23—225 X |
| 2,161,663 | 6/1939 | Baehr et al. | 23—3.3 |
| 2,490,840 | 12/1949 | Shaw | 23—2 |
| 2,537,655 | 1/1951 | Dawsey | 23—207 |
| 3,050,370 | 8/1962 | Urban | 23—226 |

FOREIGN PATENTS

| | | |
|---|---|---|
| 564,058 | 11/1932 | Germany. |
| 703,268 | 2/1965 | Canada. |

OSCAR R. VERTIZ, *Primary Examiner.*

G. O. PETERS, *Assistant Examiner.*

U.S. Cl. X.R.

23—2